United States Patent Office

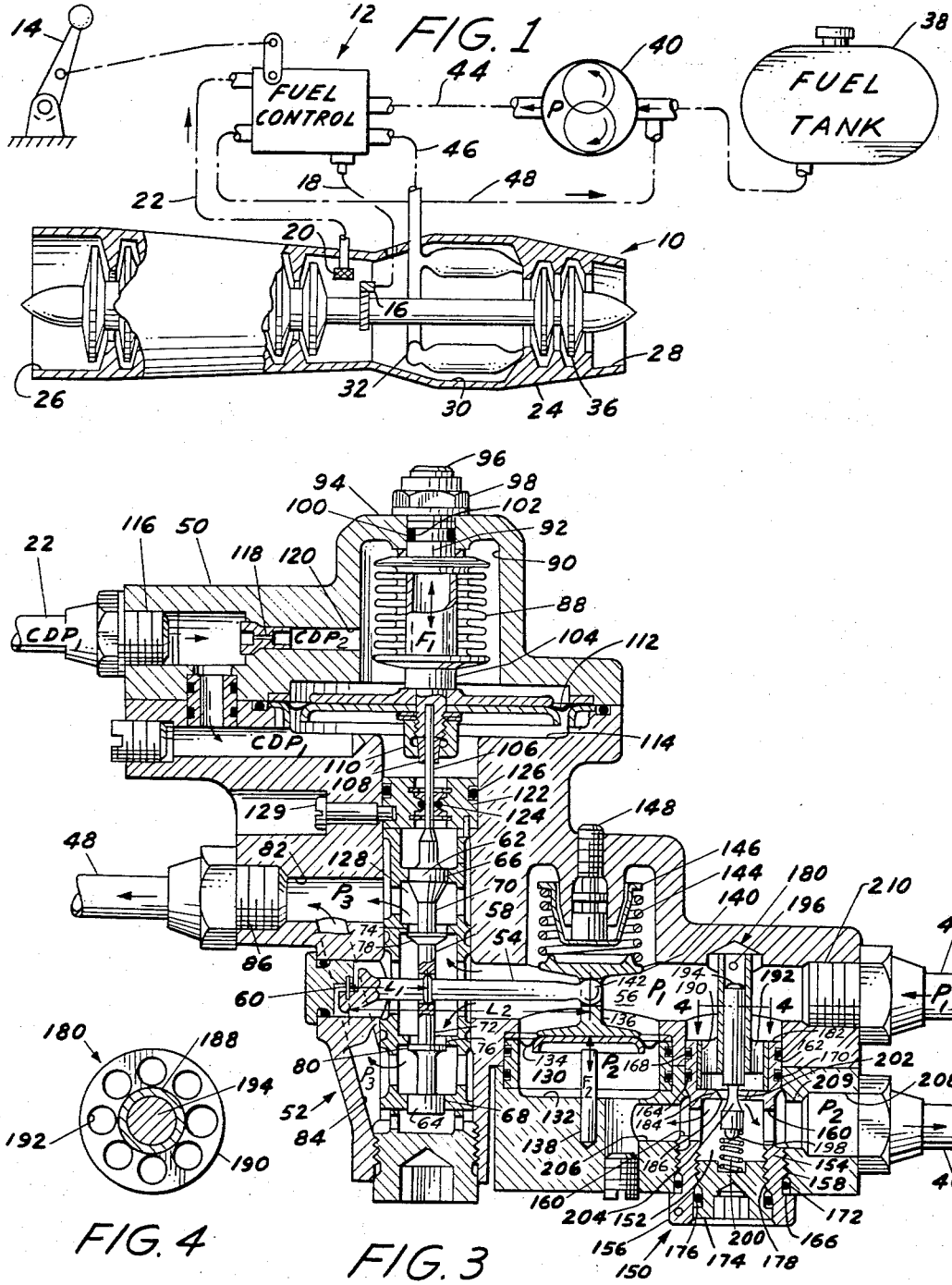
March 26, 1968     D. F. WHEELER ET AL     3,374,800
GAS TURBINE ENGINE CONTROL HAVING BY-PASS VALVE MEANS
Filed March 21, 1963     3 Sheets-Sheet 1
INVENTORS
DEAN F. WHEELER
WARREN H. COWLES
BY
ATTORNEY

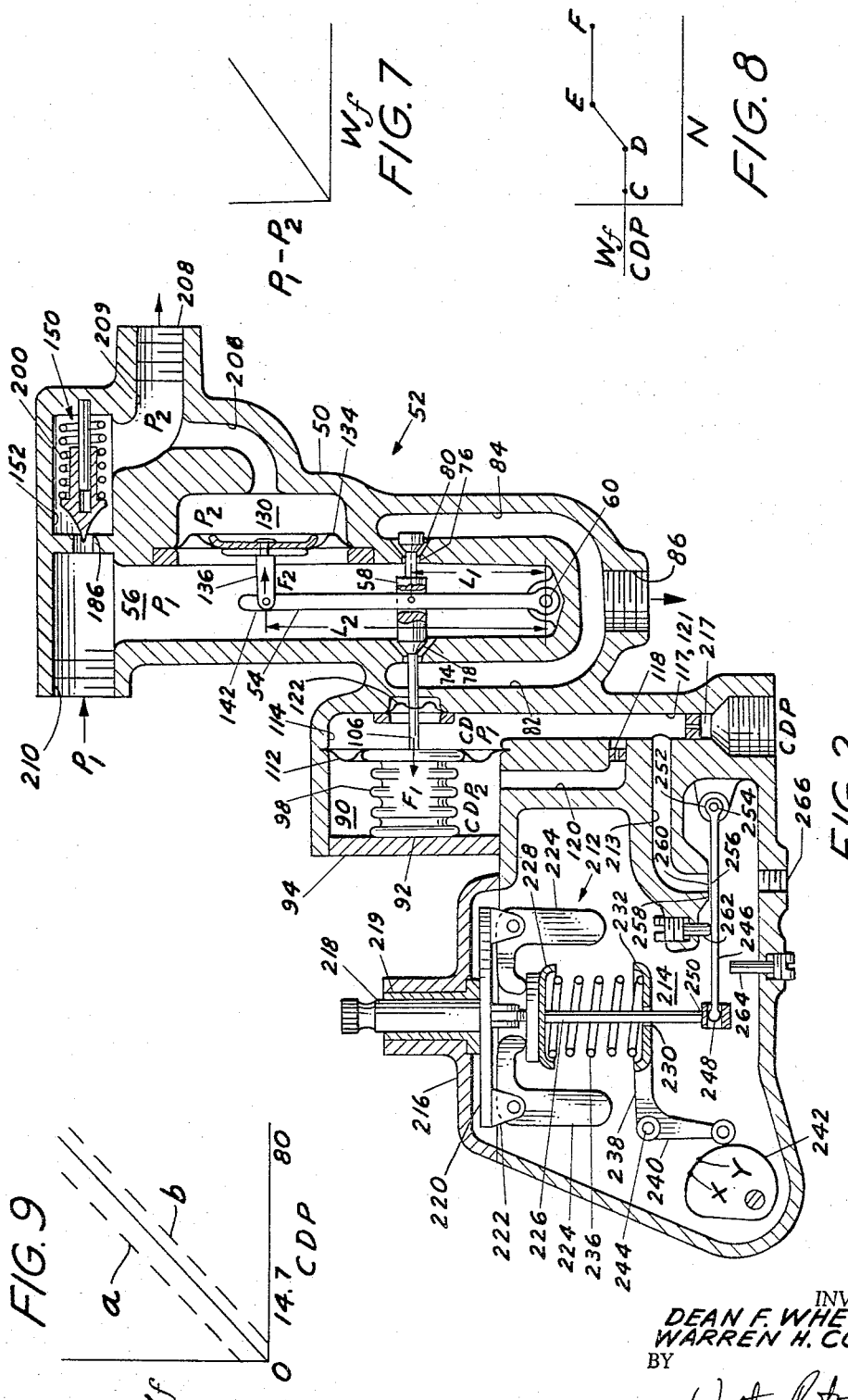

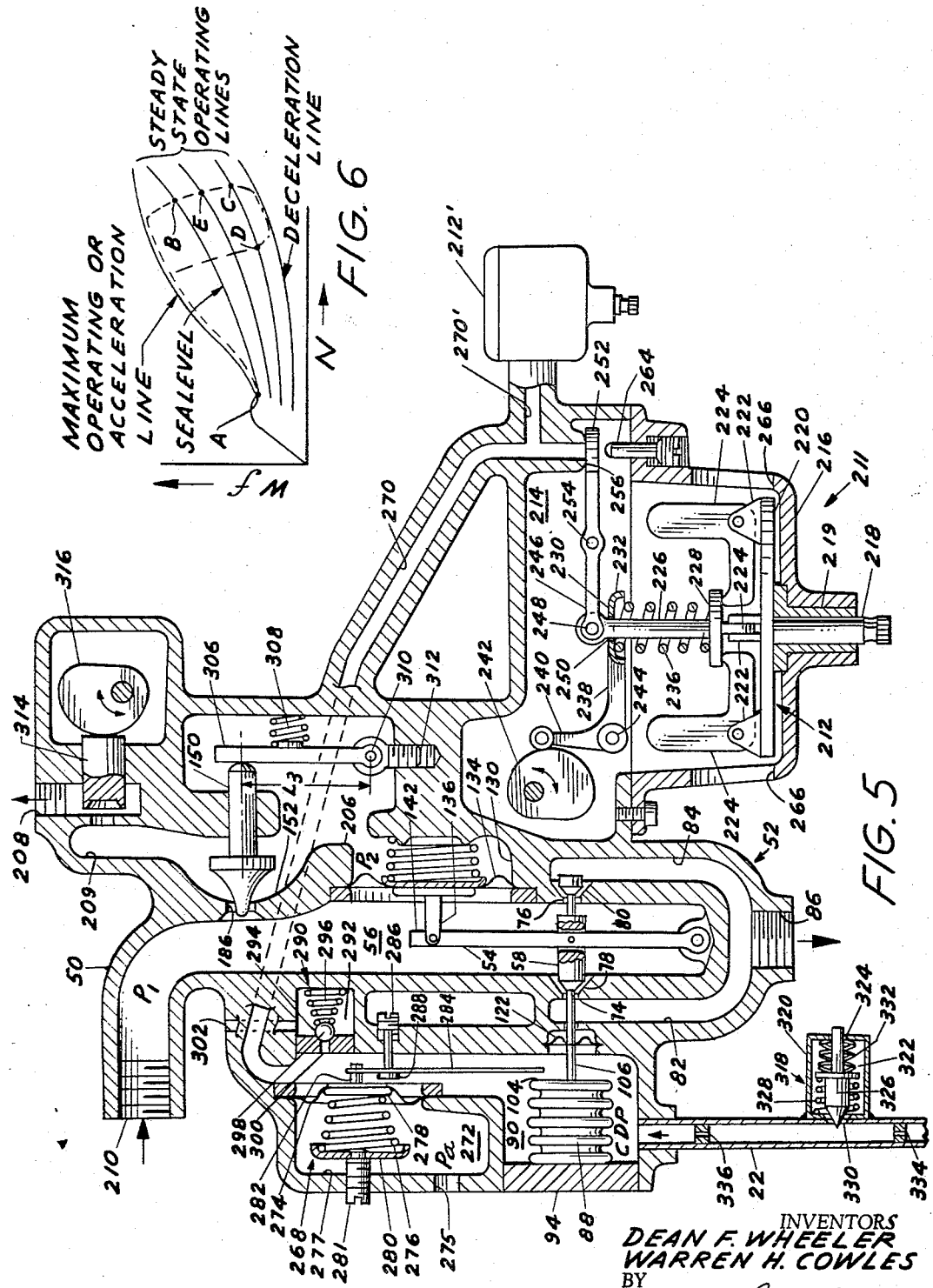

3,374,800
Patented Mar. 26, 1968

3,374,800
GAS TURBINE ENGINE CONTROL HAVING
BY-PASS VALVE MEANS
Dean F. Wheeler, Detroit, and Warren H. Cowles, Birmingham, Mich., assignors to Holley Carburetor Company, Warren, Mich., a corporation of Michigan
Filed Mar. 21, 1963, Ser. No. 267,017
9 Claims. (Cl. 137—117)

This invention relates generally to fuel controls, and more particularly to closed-loop scheduling types of fuel controls for gas turbine engines.

It is well know that parameters such as pressure, speed and temperature may be used individually and/or collectively in fuel systems for controlling and determining the operation of gas turbine power plants. However, the means heretofore employed to sense these various parameters and to provide corresponding input signals or control forces have generally been rather complex, often involving squared factors resulting from restriction or orifice type flow usually employed.

A novel means for eliminating the necessity of coping with squared flow factors, resulting in a much less expensive and more compact fuel control system, has been disclosed in U.S. application, Ser. No. 264,117, filed on Mar. 11, 1963, now abandoned in the name of Warren H. Cowles.

This invention embodies many of the features of the fuel control system disclosed by the above referenced application, as well as other novel features producing a number of advantages over previously known systems.

Accordingly, it is a primary object of the invention to provide a lightweight, compact, high pressure, hydromechanical computing type fuel control which will determine the engine fuel requirements by novel embodiments of pressure and speed sensing means.

It is a further object of the invention to provide such a device wherein the reaction or response to changes in the selected pneumatic pressure is faster than in prior systems.

Another object of the invention is to provide a fuel control device having a novel high pressure acceleration fuel system operating in conjunction with a novel pneumatic proportional type governing system.

Still another object of the invention is to provide such a governing system wherein the speed sensing mechanism is operated in ambient air, thereby eliminating the need for expensive rotating shaft seals.

These and other objects and advantages of the invention will become apparent when reference is made to the following specification and to the acocmpanying drawings wherein:

FIGURE 1 is a schematic illustration of a gas turbine engine having connected thereto a fuel control embodying the invention;

FIGURE 2 is a schematic cross-sectional view of a complete fuel control embodying the invention;

FIGURE 3 is a more detailed cross-sectional view of the acceleration fuel control system shown by the right hand portion of FIGURE 2;

FIGURE 4 is an enlarged cross-sectional view taken along the plane of line 4—4 of FIGURE 3 and looking in the direction of the arrows;

FIGURE 5 is a schematic cross-sectional view of a modification of the invention;

FIGURE 6 is a graph illustrating generally the relationships of fuel flow ($W_f$) to engine speed (N) for engine operating conditions such as acceleration, steady state and deceleration;

FIGURE 7 is a graph illustrating generally the relationship of fuel flow ($W_f$) to pressure drop ($P_1$-$P_2$) in the fuel control shown and described herein;

FIGURE 8 is a graph illustrating generally one of the characteristics of the invention; and FIGURE 9 is a graph illustrating another feature of the invention.

Referring now in greater detail to the drawings, FIGURE 1 illustrates schematically a gas turbine engine 10 having a fuel control 12 which is responsive to manual control by means of a selector lever 14, to engine speed by means of a gear box 16 and transmission line 18, and to compressor discharge pressure via a pressure probe 20 and conduit 22.

While the fuel control 12 shown and to be described herein is responsive to particular parameters, it should be understood that certain novel features of the invention may be employed in a fuel control responsive to other parameters, such as temperature and engine pressures other than that specified herein. As to those features, no limitations are intended by the particular parameters employed in the present disclosure for purposes of illustration.

A typical gas turbine engine 10 includes an outer housing 24 having an intake 26 and exhaust nozzle 28. A combustion chamber 30 having a fuel distribution ring 32 therein is located within the housing 24 between the compressor 34 and turbine 36.

The fuel supply system generally comprises a fuel tank 38, a pump 40 usually but not necessarily driven by the engine and supply conduits 42 and 44 for delivering fuel to the fuel control 12. The fuel control 12 meters the correct fuel flow for the particular engine operating requirements, as dictated by the above mentioned engine speed and compressor discharge pressure parameters, in a manner which will be described below. Correctly metered fuel is transferred to the fuel distribution ring 32 via a conduit 46, any excess fuel being bypassed back to the inlet side of the pump 40 via a return conduit 48, in a manner to be described.

*Acceleration fuel system*

As seen in FIGURES 2 and 3, the latter being a more detailed view of a portion of FIGURE 2, the fuel control 12 comprises in part a plural cavity housing 50 formed in any suitable manner and containing an acceleration fuel system 52. A force balance lever 54 is pivotally secured to the fuel control housing 50 in one of the chambers 56 therein. A valve stem 58 is pivotally connected to the lever arm 54 at a predetermined distance $L_1$ from the pivot point 60 of the lever 54, so as to be positioned substantially perpendicular to the lever arm 54. The ends 62 and 64 of the valve stem 58 may be slidably confined within guide members 66 and 68, respectively. Two reduced diameter portions 70 and 72 formed on the stem 58 operate through a pair of annular openings or valve seats 74 and 76 formed within the housing 50 so that spaced shoulders 78 and 80 function as a pair of valves, hereinafter referred to as valves 78 and 80. Outlet conduits 82 and 84 communicate with the openings 74 and 76 respectively, and converge into the outlet 86 connected to the single conduit 48 which returns to the inlet side of the pump 40.

An evacuated bellows 98 in another chamber 90 of the housing 50 is fixedly attached at its one end 92 to a wall 94 of the housing 50, as by a stud 96 and nut 98. A seal 100 located in a notch 102 in the stud 96 seals off the chamber 90 from the atmosphere. The other end 104 of the evacuated bellows 88 is secured to an extension 106 of the valve stem 58 by some suitable means, such as a tapered segment 108 and a nut 110 which serves to tighten the segment 108 around the extension 106 as the nut 110 is threadedly tightened onto the end of the bellows 88. This fastening arrangement of the tapered segment 108 and nut 110 also serves to confine a so-called derivative diaphragm 112 against the end 104 of the evacuated bellows 88, the diaphragm 112 forming a movable wall between the chamber 90 and a chamber 114, for a purpose which will be described later.

Compressor discharge air pressure, $CDP_1$, enters an inlet port 116 in the housing 50 via the conduit 22 and thence communicates with the chamber 90 by means of a conduit 117, a fixed restriction 118 and a conduit 120. A branch conduit 121 communicates between the conduit 117 and the chamber 114. The compressor discharge pressure, $CDP_2$, is referenced to absolute zero by virtue of the bellows 88 being evacuated. A low pressure seal 122, including internal and external seal rings 124 and 126, is sufficient to separate the air chamber 114 from a low pressure fuel chamber 128 adjacent the high pressure fuel chamber 56. The seal 122 may be retained in position adjacent the chamber 114 by means of a set screw 129. In view of its position in low pressure areas, the seal 122 may be simply a diaphragm, if desired.

A third chamber 130 is formed by sealing a recess 132 formed in the wall of the chamber 56 with a diaphragm 134. A stem 136 extends from the diaphragm 134 into the chamber 56 and is pivotally attached to the lever arm 54 at a second predetermined distance $L_2$ from the fixed pivot point 60. A fixed stop 138 extending from the housing 50 into the chamber 130 serves to limit the downward movement (FIGURE 3) of the diaphragm 134 in order to prevent diaphragm 134 damage. A spring seat 140 is formed on the end of the stem 136 at the side of the chamber 56 opposite the diaphragm 134, such that the end 142 of the lever arm 54 connects with the stem 136 at a point intermediate the diaphragm 134 and the spring seat 140. A spring 144 is confined at its one end by the spring seat 140 and at its other end by a spring mount 146 which is adjusted by a manually adjustable screw 148.

A so-called linear restrictor valve assembly 150 is located within still another chamber 152 formed within the housing 50. The valve assembly 150 comprises a main body 154 having one end 156 thereof threaded both externally and internally. The external threads 158 serve to attach the main body 154 to the fuel control housing 50. A plurality of ports 160 are formed through the main body wall 154, and grooves 162, 164 and 166 are formed circumferentially around the outside wall 154 for the inseration of seal rings 168, 170 and 172 therein. A manually adjustable plug 174 and another seal ring 176 are threadedly inserted into the internal threads 178 of the main body 154. A sleeve 180 is press-fitted into the counterbored end 182 of the main body 154 and abutted against an internal flange 184. The flange 184 is tapered to form a knife-edged valve seat 186 at its extreme innermost circumference. The sleeve 180 includes a central tubular section 188 and a collar portion 190, the collar portion 190 having a plurality of passageways 192 formed longitudinally therethrough. A valve stem 194 is slidably inserted in the central tubular section 188 of the sleeve 180 and retained therein at one end by a cotter pin 196. The other end of the valve stem 194 has a spring seat 198 formed thereon, and a spring 200, confined between the spring seat 198 and the adjustable plug 174, urges the valve stem 194 toward the cotter pin 196. A contoured section 202 formed on the valve stem 194 serves as a variable orifice valve 204 by virtue of its reciprocal movement relative to the knife-edged valve seat 186. Its purpose will be described later.

A conduit 206 and one of the ports 160 communicate between the chamber 152 and the chamber 130. The previously mentioned conduit 46, leading to the fuel distribution ring 32 communicates with the chamber 152 through the outlet port 208, the conduit 209 and one of the ports 160. The fuel line 44 communicates between the pump 40 and the chamber 56 via the inlet port 210.

As stated before, FIGURES 2 and 5 illustrate schematically the entire fuel control, including the detailed acceleration fuel system 52 of FIGURE 3, and those elements which are common to FIGURE 3 and FIGURES 2 and 5 bear the same reference numerals.

*Governor system*

The pneumatic governor system 211 shown in FIGURE 2 is basically a proportional type, and a modification thereof is illustrated in FIGURE 5. The governor system 211 including a speed sensing mechanism 212, may be readily embodied in the complete fuel control mechanism either as an attachment to or as an integral part of the housing 50.

The governor system 211 may be functionally connected to the acceleration fuel system 52 by means of a branch conduit 213 communicating between the conduit 117 and a chamber 214 in the governor mechanism housing 216. The conduit 117 may include a restriction 217 in order to stabilize the system.

A shaft 218 extending from the housing 216 through a bearing 219 is connected to and rotated by the transmission line 18. A plate 220 fixedly attached to the shaft 218 rotates within the chamber 214 and has affixed thereto a plurality of supports 222 to which a corresponding number of flyweights 224 are pivotally secured. A stem 226 having a collar 228 formed on one end thereof extends through a center hole 230 in a manually positioned spring seat 232 and is urged against the ends 234 of the flyweights 224 by a spring 236, the latter being compressed between the spring seat 232 and the collar 228. The spring seat 232 is positioned by virtue of its being attached to an L-shaped lever 238, one arm 240 of which is in contact with a cam 242. The lever 238 is pivoted about the point 244, and the cam 242 is rotated by the selector lever 14.

A lever 246 is pivotally connected at its one end 248 in some suitable manner to the end 250 of the stem 226, while its other end 252 is pivotally connected to a fixed pivot 254 attached to the housing 216. A portion of the lever 246 intermediate the ends 248 and 252 serves as a valving surface 256 relative to the valve seat 258 which forms the inlet 260 to the branch conduit 213. Maximum and minimum openings of the valve are determined by adjustable stops 262 and 264. The chamber 214 is exposed to ambient air by means of a port or bleed 266.

It may be desirable, in view of varying engine requirements, to eliminate the derivative diaphragm 112 and to incorporate a speed bias device 268 in the system in lieu thereof. This may be accomplished by the modification of the invention illustrated in FIGURE 5. Again, all those elements in FIGURE 5 that are similar to the elements contained in FIGURES 2 and 3 have the same reference numerals.

Referring now to FIGURE 5, the lever 246 may have the valving surface 256 at one end 252 thereof and be pivoted intermediate its ends about a fixed pivot 254. The other end 248 of the lever 246 is pivotally connected to the end 250 of the stem 226 extending through the hole 230 in the spring seat 232, as in FIGURE 2.

A conduit 270 communicates between the chamber 214 and the evacuated bellows chamber 90. Communication therethrough is controlled by the degree of opening between the valving surface 256 and the valve seat 258 formed at the entrance to the conduit 270. Maximum opening between the surface and the seat is limited by the manually adjustable stop 264.

The speed bias device 268 may be incorporated in the system in conjunction with an additional chamber 272 which may be formed by sealing a recess 274 adjoining the chamber 90 with a diaphragm 274. An air bleed 275 exposes the chamber 272 to the atmosphere. A spring 276 is confined in the chamber 272 between the diaphragm washer 278 and a manually adjustable spring seat 280, the latter being adjustable by means of a screw 281. A stem 282 extends from the diaphragm 274 into the chamber 90. A leaf spring 284 is fixedly attached in some suitable manner to the end of the stem 282, such that the leaf spring 284 extends at right angles from the stem 282 to a point adjacent the movable end 104 of the evacuated bellows 88. A manually adjustable stop mechanism 286 extends from a wall of the housing 216 and may contain some suitable end portion 288 which limits the movement of the leaf spring 284 toward the evacuated bellows 88.

A maximum flow adjustment valve assembly 290 is located in a small chamber 292. The assembly 290 may comprise a ball check valve 294 urged by a spring 296 against a seat 298 formed by an opening 300 in the wall of the chamber 90. An air bleed 302 exposes the chamber 292 to the atmosphere.

Where it is desirable to govern in accordance with power turbine speed, as well as with gas producer speed, a second speed sensing mechanism 212′, identical to the illustrated speed sensing mechanism 212, may be incorporated in the system in parallel with the speed sensing mechanism 212. It would merely be necessary for a conduit 270′ to branch off the conduit 270 and lead to a valve seat in the second unit identical to the valve seat 258.

In addition to the elements illustrated in FIGURE 5, it is to be understood that it would be possible to incorporate the derivative diaphragm 112 of the FIGURE 2 structure in the evacuated bellows chamber 90 of FIGURE 5.

Fuel density adjustment mechanism

The linear restrictor valve 150 of FIGURE 5, which may be identical to the linear restrictor valve 150 illustrated in FIGURE 3, may be urged toward a closed position by means of a lever 306 and a spring 308 confined between the lever 306 and a wall of the housing 50. The lever 306 is pivoted about a pivot point 310 which may be manually adjusted in order to change the effective length of the lever arm $L_3$. Changing lever arm $L_3$ constitutes a fuel density adjustment, making it possible to compensate for fuels having different specific gravities. In other words, if it were necessary to change from a .7 specific gravity to a .8 specific gravity fuel, a suitable compensation would be possible by making a minor manual adjustment of the adjustment screw 312.

The outlet 208 from the chamber 152 communicating with the fuel supply conduit 46 may include a positive shut-off valve 314, which, when manually closed at the end of a flight for example, via a lever (not shown) connected to the cam 316, will prevent leakage through the conduit 46. The cam 316, of course, may be associated with the selector lever 14.

Temperature sensor

If desired, a temperature sensor 318 may be incorporated in the system in order to bleed off CDP once it exceeds a predetermined value as a result of an increase or decrease in temperature of some selected medium. In other words, in a particular engine it may be desirable to bleed off CDP when a particular higher regenerator temperature is reached or when ambient temperature decreases below a preselected value as a result of an increase in altitude.

This may be accomplished by incorporating the temperature sensor mechanism 318 in the line 22. The temperature sensor 318 may comprise a housing 320 including a chamber 322, an atmospheric bleed 324 and a valve 326 urged by a spring 328 away from an opening 330 in the line 22. Bimetallic disks 332 may be confined between the end of the valve 326 and the housing 320.

Depending upon the disks 332 selected, an increase or a decrease in temperature would cause the disks 332 to contract, thereby permitting the spring 328 to urge the valve 326 further away from the opening 330, resulting in the bleeding off of CDP through the bleed port 324. The line 22 may include restrictions 334 and 336 on both sides of the temperature sensor 318 in order to provide a time lag in the system which would eliminate hunting and produce a more stable condition.

OPERATION

Before explaining the operation of the fuel control 12 in detail, it is deemed advisable to first give a brief summary of its operation. As expalined above, fuel from the tank 38 is supplied to the inlet 210 by means of pump 40, which is usually (but not necessarily) driven by the engine and the capacity of which is more than sufficient to supply the total fuel requirements for any condition of engine operation. The portion of the inlet fuel actually supplied to the engine is, of course, determined automatically by the fuel control itself. From the inlet 210, fuel flows into the chamber 56, past the linear restrictor valve 150 and into the chamber 152, through the passage 209 and the outlet 208 and then to the engine 10 through the conduit 46. It will thus be seen that all of the inlet fuel goes to the engine 10, except that fuel which is bypassed from the chamber 56 through the orifices 74 and 76, into the branch passages 82 and 84 and thence through the outlet 86 back to the inlet of the pump 40 through the conduit 48.

The amount of fuel bypassed is controlled by the movement of the evacuated bellows 88 in response to compressor discharge pressure, the latter being modulated by the position of the valve 256/258 in the pneumatic governor system 211. Movement of lever arm 246 operating valve 256/258 is determined by the preload of spring 236 set by cam 242, which is rotated by the manual selector lever 18, and the operation of governor weights 224.

It may also be advantageous to first describe generally the operation of the basic closed-loop moment balance system 52 and the effect of the novel linear restrictor valve 150. For this purpose, it can be assumed that the system 52 is in equilibrium and that the compressor discharge pressure decreases for some reason or another that is not important in this discussion. With that assumption in mind and ignoring for the moment the derivative diaphragm 112, and referring to FIGURE 2, it can be seen that as the valve stem 58 and the attached lever arm 54 move to the right in response to a decrease in compressor discharge pressure surrounding the evacuated bellows 88, more fuel is bypassed through the ports 74 and 76, passages 82 and 84 and ultimately to the inlet of the pump 40 through the conduit 48. This results in a decrease in pressure in the chamber 56. The linear restrictor valve 150 is then urged toward a more nearly closed position by the spring 200, resulting in a decrease in pressure in the conduit 206 and the chamber 130 to the right of the diaphragm 134.

It can be seen from the solid straight line curve of FIGURE 7 that the pressure differential, $P_1-P_2$, will decrease lineally as the fuel flow $W_f$ decreases. This linear relationship is achieved by suitably contouring the valve 150. Since the force $F_1$ is reduced due to the effect of the decrease in compressor discharge pressure on the evacuated bellows 88 in the chamber 90, it reduces the $P_1-P_2$ differential, which, in conjunction with the diaphragm 134, produces a lesser force $F_2$ than before the additional fuel was bypassed, and results in a return of the moment balance system back to equilibrium. In other words, a reduction in force $F_1$ eventually results in a reduction in force $F_2$ so as to return the system to equilibrium. The term "closed-loop" is commonly applied to this type of equilibrium-seeking moment balance system, and the above type of operation takes place whenever anything occurs to throw the system out of balance.

If a fixed restriction were employed in lieu of the linear restriction valve 150, as has been the common practice heretofore, equilibrium could still be obtained; however, a much more complicated system of diaphragms, levers, and/or springs would be required for use in conjunction with the acceleration fuel lever 54, as will become more apparent later in the description.

The detailed operation of the complete fuel control unit 12, as illustrated in FIGURE 2, will now be discussed in conjunction with a typical Fuel Flow ($W_f$) vs. Speed (N) curve (FIGURE 6) illustrating the various engine operating conditions.

It will first be assumed that the engine 10 has been and that it is idling at sea level, at which time fuel control unit 12 is receiving fuel at a pressure $P_1$ from the pump 40 through the inlet port 210. This idle condition of engine operation is represented by point A of FIGURE 6. At this time, the pressure within the fuel control unit 12 would be as indicated by FIGURE 2, i.e., there would be a pressure drop across the valve 150, resulting in fuel at a pressure $P_2$ supplied to the engine 10, as well as in the conduit 206 and the chamber 130.

Furthermore, the system would be in a steady state or equilibrium condition. That is, the compressor discharge pressure, heretofore referred to as CDP, in chamber 90 would have compressed the evacuated bellows 88 to produce a force $F_1$ to the left (FIGURE 2) and resulting in a moment balance $(F_1 \times L_1 = F_2 \times L_2)$ about pivot 60 of lever arm 54, the force $F_2$ resulting from the $P_1-P_2$ differential across diaphragm 134. As illustrated in FIGURE 2, $L_1$ and $L_2$ may be any predetermined lengths along the lever arm 54. During this steady state condition, a particular constant amount of fuel would be bypassed back to the pump inlet through passages 82 and 84 and conduit 48.

Prior to take off, the manual selector lever 14 would be pivoted so as to rotate the cam 242 in a clockwise direction until some point X is in contact with the arm 240. This woud pivot the L-shaped lever 238 in a counterclockwise direction about the fixed pivot pin 244, thereby compressing the spring 236 and causing the stem 226 to be pulled upwardly (FIGURE 2). This would rotate clockwise the lever arm 246 about the fixed pivot point 254, thereby closing the valving surface 256 against the valve seat 258. With valve 256/258 closed, all of the increased $CDP_1$ would be supplied to chambers 114 and 90 via the conduits 117, 121 and 120 and fixed restrictions 217 and 118.

This initial transient condition would also result momentarily in $CDP_1$ being greater than $CDP_2$ by virtue of the fixed restriction 118 in the conduit 120 leading to the chamber 90. This increased $CDP_1$ and the differential $(CDP_1-CDP_2)$ would serve to instantaneously move valves 78 and 80 to the left and close off the ports 74 and 76, resulting in an increase in pressure $P_1$ in the chamber 56 and an increased flow of fuel to the engine via the outlet 208. The derivative diaphragm 112 and the conduit 120 and restriction 118 may be employed to give a faster initial response to satisfy the requirements of a particular engine. When pressure $CDP_2$ becomes equal to $CDP_1$, the effect of derivative diaphragm 112 is, of course, completed; however, the increased $CDP_1$ is still effective.

During the above initial transient or non-equilibrium conditions, the result of moving the lever 54 would be an acceleration along the dotted curve from point A to some point B on the sea level curve, FIGURE 6. As explained above, the resultant increased pressure $P_1$ in the chamber 56 would further open the linear restrictor valve 150 against the force of the spring 200 and supply more fuel to the engine, shown by FIGURE 7, fuel flow, $W_f$, increases lineally with increasing $P_1-P_2$.

The increased $F_2$ ($P_1-P_2$ applied to diaphragm 134) would pivot the lever 54 to the right in FIGURE 2, whereas the initial increased $CDP_1$ tends to pull the lever 54 to the left. However, after the initial closing of the valve 256/258 by the compression of the spring 236, the engine 10, and thus the flyweights 224, would progressively increase in speed in response to the increased fuel flow. As the speed of rotation of the flyweights 224 increases, centrifugal force will pivot the arms 234 against the spring seat 228, thereby loading the spring 236 and opening the valve 256/258. This serves to bleed off some of the pressure $CDP_1$ through the atmospheric bleed 266, thereby reducing the pressure $CDP_1$ surrounding the evacuated bellows 88 in the chamber 90 and allowing the lever 54, and thus the valves 78 and 80, to move to the right until balanced by the effect of $P_1-P_2$ on the diaphragm 134. Since the above operation is at sea level, the resultant balanced condition would be represented by point B on the sea level curve of FIGURE 6.

Once the aircraft has taken off and while climbing to some altitude represented by point C in FIGURE 6, $CDP_1$ will continuously decrease, causing the lever 54 to move toward the right in FIGURE 2. This will bypass more fuel through the conduits 82, 84 and 48 to the pump 40 inlet, causing the reduction of pressure $P_1$ in the chamber 56. The reduced $P_1$ will permit the spring 200 to force the linear restrictor valve 150 toward the seat 186, thereby reducing fuel flow to the engine 10 and at the same time reducing pressure $P_2$ in the conduit 206 and the chamber 130. The $P_1-P_2$ differential would, of course, be reduced with the decreased fuel flow (see FIGURE 7), permitting the acceleration fuel system 52 to once again come to an equilibrium condition.

Steady state or equilibrium operation represented by point C in FIGURE 6 would be maintained until such time, for example, as it would be desired to decrease speed. Decreasing speed would be accomplished by moving the selector lever 14 in the opposite direction so as to rotate the cam 242 counterclockwise from X to Y, thereby opening the valve 256/258 and lowering the pressures throughout the system, increasing bypass fuel flow and decreasing fuel flow to the engine 10, all of which are the reverse of the operation when the cam 242 was first moved to X. The above would result in a deceleration from point C to point D along the dot-dash line of FIGURE 6.

Acceleration from point D to a greater speed at a different altitude, such as indicated by point E, would be along the dash-double dot line to the dotted acceleration line, and then along the dotted line past B to E.

From the above description, it will be apparent that a fuel control embodying the invention is adapted for use in any gas turbine engine having operating conditions typically represented by curves such as those shown by FIGURE 6.

It is also apparent that the invention embodies a novel pneumatic governor system wherein governing is accomplished simply by bleeding off compressor discharge pressure. Besides eliminating a relatively complicated hydraulic system with its associated multiple hydraulic pressure characteristics, the invention further eliminates the usual expensive high pressure seals and pressure responsive means required by hydraulic governing systems. In other words, the flyweights 224 operate in a chamber filled with air and vented to atmosphere, rather than in a sealed chamber filled with fuel under pressure.

It is further apparent that the invention provides a novel means for obtaining a rapid response to changes in the selected pneumatic parameter. This, of course, is accomplished by means of the derivative or rate diaphragm 112 used in conjunction with the evacuated bellows 88. In other words, an increase in $CDP_1$ will cause the valves 78 and 80 to move rapidly toward a closed position until $CDP_2$ becomes equal to $CDP_1$. Likewise, upon a decrease in $CDP_1$, $CDP_2-CDP_1$, the pressure differential acting on the area of the diaphragm 112, will immediately move the valves 78 and 80 to the right (FIGURE 2) and thus instantly open the ports 74 and 76.

The operation of the FIGURE 5 modification, which is intended for ground installation, would be generally similar to that of FIGURE 2, which may be used for either aircraft or ground application. It should be noted that the derivative diaphragm 112 of FIGURE 2 could be employed in the FIGURE 5 structure and that FIGURE 5 includes a means 268 for biasing the fuel schedule, in response to a pneumatic pressure differential, $CDP-P_a$ (ambient air), rather than to the usual hydraulic pressure differentials.

One gas turbine engine specification sometimes required to be considered is, in effect, a plot of $W_f/CDP$ vs. N. Some engines, for example, require a constant $W_f/CDP$ ratio over the entire speed range; other engines require a varying ratio such as that shown in FIGURE 8 wherein the ratio is greater at higher speeds.

Ignoring the effects of inlet temperature and assuming a fixed altitude, the bias device 268 will result in the fuel flow vs. speed relationship illustrated in FIGURE 8. Whether the effect of the device 268 is to be applied to the force balance system 52 over the complete speed range or only to some portion thereof may be controlled by changing the preload of the spring 276 by means of the adjustable screw 281 and/or by adjusting the stop 286.

As speed increases, such as would result from the counterclockwise rotation of the cam 242 against the arm 240, the pressure differential across the diaphragm 274, $CDP-P_a$, would increase since less CDP would bleed off past the valve 256/258 and through the atmospheric vent 266. This would result in the leaf spring 284 being moved against the end of the bellows 104. Even though CDP is continuously increasing with increased speed, the increased force of the leaf spring 284 acting on the end of the bellows 88 provides the same effect as if CDP were increasing at some greater rate. This moves the valve stem 58 farther to the left in FIGURE 5 so as to close valves 78 and 50 and reduce the amount of fuel by-passed through the ports 74 and 76, passages 82 and 84 and the conduit 48. This increases the fuel flow, $W_f$, to the engine 10, accordingly. The above effect is illustrated by the line D–E in FIGURE 8.

It is apparent that a constant $W_f/CDP$ ratio would be maintained, despite increased speed, any time that the leaf spring 284 is restrained from further travel by the flange 288 of the stop 286. This is represented by the line E–F, FIGURE 8. Similarly, constant $W_f/CDP$ ratio would be maintained at lower speeds, line C–D of FIGURE 8, as long as $CDP-P_a$ is low enough so that the leaf spring 284 does not exert a force on the bellows 88.

Check valve 290 is an additional bleed device to bleed off CDP once it exceeds a predetermined value in the chamber 90. This valve 290 may comprise a port 300 having a valve seat 298 formed thereon and a ball valve 294 urged against the seat 298 by a spring 296 until such time as CDP overcomes the spring 296 and bleeds off to the atmosphere through the port 302. This serves to limit the maximum fuel flow to the engine 10 since the degree of closure of the bypass ports 74 and 76 will be limited.

Referring again to FIGURE 3, an adjustment device 148 may be incorporated in the acceleration fuel system 52 in conjunction with the diaphragm 134 and stem 136 to maintain the reference of CDP to absolute zero. The function of this device may best be realized by referring to the curve of FIGURE 9. In other words, if after initial assembly it were discovered that the relationship of $W_f$ to CDP was as represented by either of the dotted line curves *a* or *b*, a correction to the solid line absolute zero curve could be obtained by simply adjusting the screw 148, thereby changing the starting position of the lever arm 54 and hence the initial setting of the bypass openings 74 and 76.

From the above discussion, it is apparent that the invention provides a compact and efficient fuel control device having a number of novel features resulting in greater accuracy, faster response, fewer parts and, particularly a much less complicated hydraulic system, as compared to prior art devices.

Although but two embodiments of the invention have been disclosed and described, it is apparent that other modifications may be made within the scope of the appended claims.

What we claim as our invention is:

1. A hydraulic system, comprising a high pressure chamber; a low pressure return; a control valve between said high pressure chamber and said low pressure return; a source of air under pressure; a pneumatic pressure responsive system physically connected to and directly operating said control valve, said pneumatic system including a first chamber having a first pressure responsive means therein, a second pressure responsive means forming a movable wall between said first chamber and a second chamber, a conduit communicating between said first and second chambers, and a restriction in said conduit; and means enabling the use of a low pressure seal to separate hydraulic fluid from said second chamber, said means being the connection of said pneumatic system to said valve through said low pressure return rather than through said high pressure chamber.

2. A fuel control mechanism comprising a source of fuel under pressure, a fuel inlet port; first and second fuel outlet ports; separate conduits communicating between said inlet port and each of said outlet ports; valve means in said conduit leading from said inlet port to said first outlet port; a source of air under pressure; and a closed-loop acceleration fuel system, said system including a lever and bypass valve in said conduit leading from said inlet port to said second outlet port, said bypass valve being pivotally connected to said lever at substantially right angles thereto, first and second pressure responsive means fixedly attached to one end of said bypass valve, said first and second pressure responsive means being responsive to said air pressure, and a third pressure responsive means pivotally connected to a second point along said lever, said third pressure responsive means forming a movable wall between the fluid in said conduit leading to said second outlet port and the fluid in said conduit leading to said first outlet port downstream of said valve means.

3. In combination with the device described in claim 2, an adjustment device in said conduit leading from said inlet port to said second outlet port, said adjustment device comprising a manually adjustable spring mount, a movable spring seat pivotally connected to said second point along said lever opposite said third pressure responsive means, and a spring confined between said adjustable spring mount and said movable spring seat.

4. In a fuel control having a housing, an inlet port, an outlet port, and a closed-loop communication system therebetween, a source of air under pressure, an acceleration fuel system, said acceleration fuel system comprising a moment balance system including valve means for metering fuel, a lever pivotally connected at its one end to said housing and being operably connected to said valve means at a point intermediate the ends thereof, first and second pressure responsive means fixedly attached to one end of said valve means, said first and second pressure responsive means being responsive to said air pressure, and a third pressure responsive means operably connected substantially near the other end of said lever, a second valve means between said inlet port and said outlet port for maintaining a linear relation between metered fuel flow and pressure drop thereacross, and a conduit communicating between said third pressure responsive means and a point intermediate said second valve means and said outlet port.

5. A fuel control system comprising a source of fuel under pressure, a housing, a fuel inlet port, a fuel outlet port, a conduit communicating therebetween, a first chamber in communication with said conduit, lever and valve means in said first chamber, said lever being pivotally supported at its one end in said housing and being operably connected to said valve means at a fixed distance from said pivotally supported end, a source of air under pressure, a second chamber containing a first means responsive to said pneumatic pressure, a second means responsive to said pneumatic pressure, said second means forming a movable wall between said second chamber and a third chamber, said first and second pressure responsive means being fixedly attached to an extension from said valve means, seal means between said first chamber surrounding said valve means and said third chamber surrounding said extension, second valve means in said conduit for maintaining a linear relation between metered fuel flow and pressure drop across said second valve means, a third pressure responsive means operably connected to said lever at a second fixed distance from said pivotally supported end, said third pressure responsive means forming a movable wall between said first chamber and a fourth chamber, and a conduit communicating between said fourth chamber and a point intermediate said second valve means and said fuel outlet port.

6. In a fuel control for a gas turbine engine, including a source of fuel under pressure, a housing and a fuel passage therethrough, a source of air under pressure, an acceleration fuel system, said system comprising a first chamber in said housing, a lever arm in said first chamber pivotally attached at its one end to said housing, a second chamber in said housing, a first air pressure responsive means in said second chamber fixedly attached at its one end to said housing, a second air pressure responsive means fixedly attached to the other end of said first air pressure responsive means, said second air pressure responsive means forming a movable wall between said second air chamber and a third chamber, a valve means pivotally attached to said lever arm and fixedly attached to said first and second pressure responsive means through said third chamber, a third pressure responsive means pivotally attached to said lever arm substantially near the other end thereof, said third pressure responsive means forming a movable wall between said first chamber and a fourth chamber, a resilient means located in said first chamber for urging said third pressure responsive means toward the fourth chamber, a second valve means in said fuel passage for maintaining a linear relationship between metered flow through said passage and the pressure drop across said second valve means, and a conduit communicating between said fourth chamber and said fuel passage downstream of said second valve means.

7. In a closed-loop acceleration fuel system, having sources of fuel and air under pressure, a moment balance system, comprising first air pressure responsive means; bypass valve means fixedly attached to said first air pressure responsive means; a lever pivotally supported at its one end and having a pair of ball joints formed thereon at fixed distances from said pivotally supported end, said ball joint closer to said supported end being pivotally connected to said bypass valve, and a fuel pressure responsive means operably connected to said ball joint farthermost from said pivotally supported end; seal means between said first air pressure responsive means and said bypass valve means; a valve for maintaining a linear relation between metered fuel flow and pressure drop across the bypass valve; a conduit communicating between said fuel pressure responsive means and a point intermediate said valve and said outlet port; and a second air pressure responsive means fixedly secured to said first air pressure responsive means and forming a movable wall between said first air pressure responsive means and said seal means.

8. In a closed-loop acceleration fuel system having sources of fuel and air under pressure, a high pressure moment balance system, comprising first air pressure responsive means; valve means fixedly attached to said first air pressure responsive means; a lever pivotally supported at its one end and having a pair of ball joints formed thereon at fixed distances from said pivotally supported end, said ball joint closer to said supported end being pivotally connected to said bypass valve, and a fuel pressure responsive means operably connected to said ball joint farthermost from said pivotally supported end; low pressure seal means between said first air pressure responsive means and said valve means; a valve for maintaining a linear relation between metered fuel flow and pressure drop across the valve; a conduit communicating between said fuel pressure responsive means and a point intermediate said valve and said outlet port; and a second air pressure responsive means fixedly secured to said first air pressure responsive means and forming a movable wall between said first air pressure responsive means and said seal means.

9. In combination with the device described in claim 8, a fuel density device, said device comprising a second lever fastened at its one end to a manually adjustable pivot point, and a spring urging the other end of said second lever against one end of said linear restrictor valve for moving said valve toward a closed position.

References Cited

UNITED STATES PATENTS

| | | | |
|---|---|---|---|
| 2,791,229 | 5/1957 | Pasco | 137—117 |
| 2,957,488 | 10/1960 | Farkas | 137—117 |
| 2,643,514 | 6/1953 | Jubb | 60—39.28 |
| 2,943,447 | 7/1960 | Davies | 60—39.28 |
| 2,233,649 | 3/1941 | Stahl | 137—543.13 |
| 2,740,425 | 4/1956 | Garland | 137—543.13 |
| 2,452,088 | 10/1948 | Whitehead | 137—26 |
| 2,765,800 | 10/1956 | Drake | 137—26 |
| 2,667,743 | 2/1954 | Lee | 60—39.28 |
| 2,691,268 | 10/1954 | Prentiss | 60—39.28 |
| 2,697,328 | 12/1954 | Lee | 60—39.28 |
| 2,939,280 | 6/1960 | Farkas | 60—39.28 |
| 2,971,339 | 2/1961 | Gold | 60—39.28 |
| 3,118,491 | 1/1964 | Simons | 60—39.28 |
| 2,917,067 | 12/1959 | Pearl | 137—117 |
| 3,152,603 | 10/1964 | Zeisloft | 137—117 |
| 3,219,309 | 11/1965 | Alberani | 137—115 X |

FOREIGN PATENTS 848,560  9/1960  Great Britain.

CLARENCE R. GORDON, *Primary Examiner.*